(12) United States Patent
Zimbalatti

(10) Patent No.: US 8,172,191 B1
(45) Date of Patent: May 8, 2012

(54) LAPTOP COMPUTER SUPPORT

(76) Inventor: Anthony T. Zimbalatti, Plymouth, MI (US)

( * ) Notice: Subject to any disclaimer, the term of this patent is extended or adjusted under 35 U.S.C. 154(b) by 33 days.

(21) Appl. No.: 12/800,424

(22) Filed: May 14, 2010

(51) Int. Cl.
*A47B 91/00* (2006.01)

(52) U.S. Cl. .............. 248/346.01; 248/688; 248/188.91; 16/374; 16/266

(58) Field of Classification Search ............ 248/346.01, 248/188.1, 188.6, 188.91, 205.3, 150, 151, 248/371, 346.03, 34, 6.3, 463, 462, 918, 248/688; 361/679.55; 16/341, 355, 356, 16/374, 266, 267, 389, 265
See application file for complete search history.

(56) References Cited

U.S. PATENT DOCUMENTS

| | | | |
|---|---|---|---|
| 925,910 A * | 6/1909 | Hoke | 16/265 |
| 1,132,601 A * | 3/1915 | Moynihan | 16/266 |
| 4,113,212 A * | 9/1978 | Coriden | 248/455 |
| 5,337,985 A * | 8/1994 | Hale | 248/174 |
| 5,503,361 A * | 4/1996 | Kan-O et al. | 248/688 |
| 5,791,015 A * | 8/1998 | Wandinger | 16/228 |
| 6,279,861 B1 * | 8/2001 | Nolan | 248/188.2 |
| 6,508,451 B1 * | 1/2003 | Blythe et al. | 248/688 |
| 6,682,040 B1 * | 1/2004 | MacEachern | 248/349.1 |
| 6,834,416 B2 * | 12/2004 | Wang et al. | 16/266 |
| 7,600,730 B2 * | 10/2009 | Leung | 248/346.3 |

* cited by examiner

*Primary Examiner* — Anita M King
(74) *Attorney, Agent, or Firm* — Thomas Randazzo

(57) ABSTRACT

A laptop computer support device for conveniently supporting a laptop computer on a horizontal surface, and which device supports the computer in a preferred and optimal position for use of the keyboard. In its broadest aspects, the device is a portable, adjustable laptop computer support that also provides improved heat dissipation from the laptop computer while it is in use. The device is further advantageous in that it is does not need to be separately stowed away or carried because it basically becomes part of the laptop computer case. The device comprises a base and a stand that can be folded and secured relative to one another in a preferred operational configuration.

1 Claim, 3 Drawing Sheets

LAPTOP COMPUTER SUPPORT

TECHNICAL FIELD

This disclosure is directed to a laptop computer support device that can be easily employed to elevate a laptop computer on a horizontal surface to provide a comfortable working angle and to provide improved heat dissipation while the laptop computer is being used.

BACKGROUND

The use of laptop or notebook computers has proliferated in recent years to such a degree that it is very common to see them being used on airplane tray tables, in classrooms, in meetings, in libraries, in restaurants, in coffee shops, in offices, and, last but certainly not least, at kitchen tables. Many workers prefer laptops because they can take them home to work whenever it is convenient. With such a wide array of circumstances of use, there are an equal number of physical conditions and positions in which the user may find himself or herself when using a laptop computer. Most, if not all, of these venues do not present the optimal situation for comfortable, ergonomically correct positioning of the laptop computer relative to use of the keyboard. And most of the time the computer is being used on a flat, horizontal surface and not on one's "lap" as the name "laptop" computer might imply.

Laptop computers are basically comprised of a case and a display monitor pivotally attached to one another. The case houses the microprocessor unit, horizontal-drive, CD-ROM drive and other electrical components. Users typically position the laptop computers on tables, desks and other horizontal, stable surfaces, notwithstanding again the implication of the term "laptop." Unfortunately, conventional laptop computers have relatively small and ergonomically uncomfortable keyboards making it difficult for the user to utilize over extended periods of time. A user may connect an external keyboard to solve this problem, but this requires additional hardware and desktop space that may not always be available. A further problem with conventional laptop computers is that the keyboard is typically not at an ergonomically suitable level for operation, even when it is lying on a horizontal surface.

It is also a fact that laptop computers employ microprocessors that generate considerable heat. In fact, the heat generated from microprocessors is generally considered the limiting factor in computing speed and reduced battery life. Recognizing that heat generated from microprocessors limits the speed and resulting power of the computing device, efforts have been made to dissipate thermal energy that is generated while the computer is in use. Most computers employ cooling fans integrated within the computer's case or chassis to dissipate the heat. A laptop computer lying on a flat horizontal surface is not a particularly efficient method of dissipating heat energy because the horizontal surface may not be an effective heat conductor. Unless the heat is effectively dissipated, the heat generated by the microprocessor can cause it to overheat and damage the device.

With respect to laptop computer use, another issue presented is keeping the laptop computer keyboard at a comfortable height and angle relative to the wrists and hands, of the user. This height and angle is typically dictated by the chair or seat in which the user is seated and the surface on which the computer is placed. If the chair or seat is relatively low as compared with the height of the table or support surface on which the computer is placed, the user's tendency is to adjust the laptop computer to be tilted forward or toward the user. This is an awkward position for proper use of the keyboard. Similarly, if the seat is relatively high when compared with the height of the table or support surface on which the computer is placed, then the user's tendency is to tilt the computer away from the user. In either case, the problem is that the keyboard is not in an optimal position for use. And contrary to conventional thinking, a substantially horizontal position for use of the keyboard is not the most desirable or ergonomically correct position for most users.

Because it is not always possible to achieve the ideal laptop keyboard positioning, various laptop support stands have been provided that attempt to solve some of these inherent positioning problems with laptop computers. Unfortunately, these attempted solutions are typically cumbersome and difficult, if not impossible, to set up on airplane tray tables, in classrooms, in meeting rooms, in libraries, in restaurants, in coffee shops, or at kitchen tables. None of these devices satisfactorily address the proper positioning of the keyboard relative to the user's wrists or arms.

U.S. Pat. No. 6,305,652 to Borke describes another device for a laptop computer when it is being used on the lap of user. The Borke device is comprised of three or more hinged panels that can be selectively folded and secured to provide a "universally adjustable" support surface within a defined range of support surface angles. U.S. Pat. No. 5,732,910 to Martin is again directed to a device for use of a computer on the user's lap. The Martin device is adapted to establish a stable base for the computer equipment, and to provide support for the wrists of the user. In addition, the invention includes a means for supporting an input pointer device, such as a mouse or trackball, and further provides storage for computer floppy disks and the like, as well as a structure for storage and transport of a laptop computer.

U.S. Pat. No. 5,503,361 to Kan-O discloses an adjustable stand for mounting a notebook-type personal computer or a pen-input-type personal computer. The device described in the Kan-O patent discloses that it is not for use on a person's lap, but rather is intended for desk top or tabletop use. U.S. Pat. No. 6,098,952 to Tonn also discloses a support device for supporting a laptop computer, particularly of the type for supporting a laptop computer on a desk at an edge of the top of the desk. The Tonn device supports the laptop computer such that a front end of the laptop computer extends past the edge of a desk or table to a position above the lap of an individual sitting at the desk or table.

All of the devices referenced above provide some desirable features and benefits for supporting a laptop computer within the limited scope of their design. However, each has certain obvious drawbacks, as well. Unfortunately, these devices are typically bulky, heavy, cumbersome, difficult to utilize, or are incapable of being set up on airplane tray tables, in classrooms, in meeting rooms, in libraries, in restaurants, in coffee shops, or at kitchen tables.

From the foregoing, it would be desirable to have a laptop computer support device that can be easily employed to elevate a laptop computer on a horizontal surface to provide a comfortable working angle for access to the computer keyboard. It would also be desirable to have a laptop computer support device that is easily adaptable to any laptop computer being utilized on any horizontal surface in virtually any location. And it would be extremely desirble to have a laptop computer support device that also provides some amount of improved heat dissipation for the laptop computer's microprocessor while it is in use.

SUMMARY

Disclosed herein is a laptop computer support device that satisfies these needs. Heretofore, there has not been a laptop computer support device that could be easily used to elevate a laptop computer on a horizontal surface to provide a comfortable working angle for typing on the computer keyboard, while at the same time allowing for improved heat dissipation from the laptop computer.

The disclosure herein is directed to a laptop computer support device to elevate a laptop computer on a horizontal surface to provide a comfortable working angle for typing on the computer keyboard and provide improved heat dissipation from the laptop computer. There is also disclosed a method of providing a comfortable typing angle for a laptop computer and a method for improved heat dissipation from a laptop computer.

While the various embodiments of the disclosure are described with reference to a device to elevate a laptop computer on a horizontal surface to provide a comfortable working angle for access to the computer keyboard and to improve heat dissipation, it is to be understood that there may be combinations of equipment and methods that could be used to elevate a laptop computer on a horizontal surface to provide a comfortable working angle and to improve heat dissipation from the unit. There is no device or apparatus with the disclosed components that is capable of elevating a laptop computer on a horizontal surface to provide a comfortable working angle for access to the computer keyboard and to improve heat dissipation from the unit. Other applications and advantages of such a laptop support device will become immediately obvious to one skilled in the art. It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

DESCRIPTION

What is being disclosed is a laptop computer support device to elevate a laptop computer on a horizontal surface to provide a comfortable working angle for typing on the computer keyboard. Other objects, advantages and applications will be best understood and become apparent from the following description of the various embodiments when read in connection with the accompanying drawings.

Figure 1:
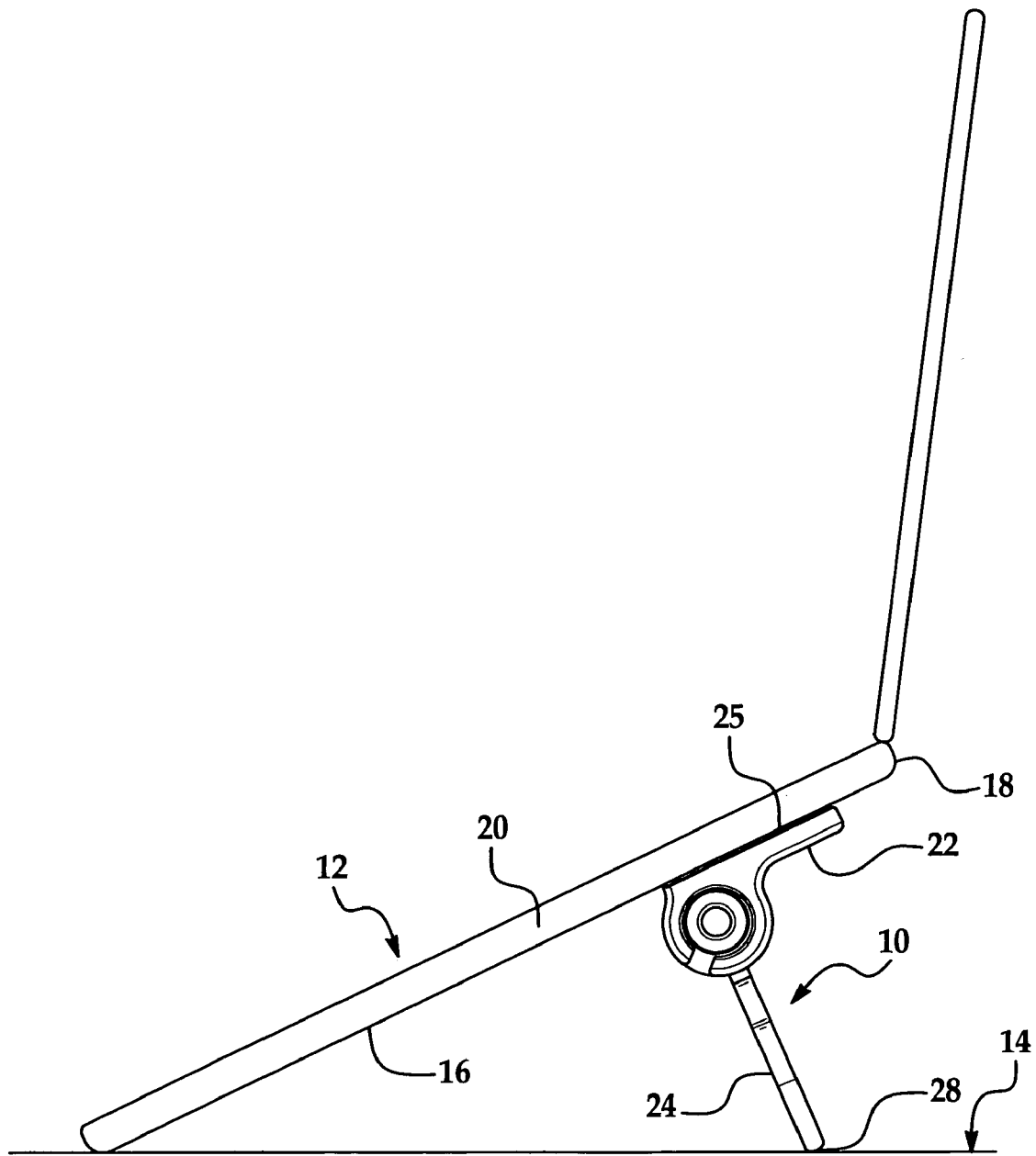
FIG. 1 is a side view of one embodiment of the present invention shown elevating a laptop computer on a horizontal surface.
Figure 2:
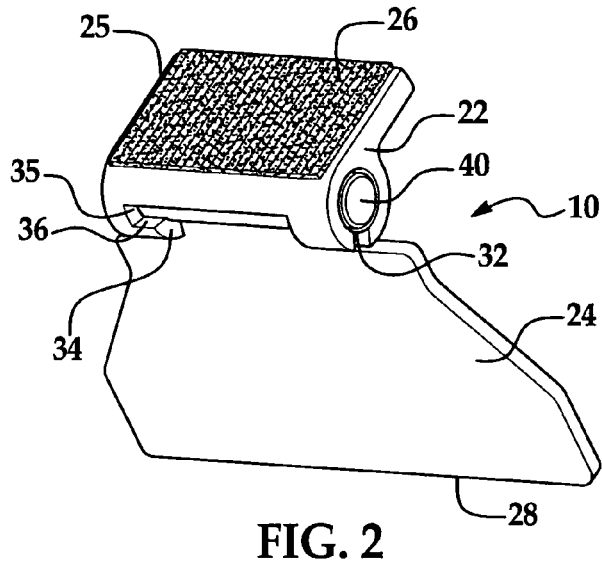
FIG. 2 is a perspective view of one embodiment of the present invention showing the base and stand in combination.
Figure 2A:
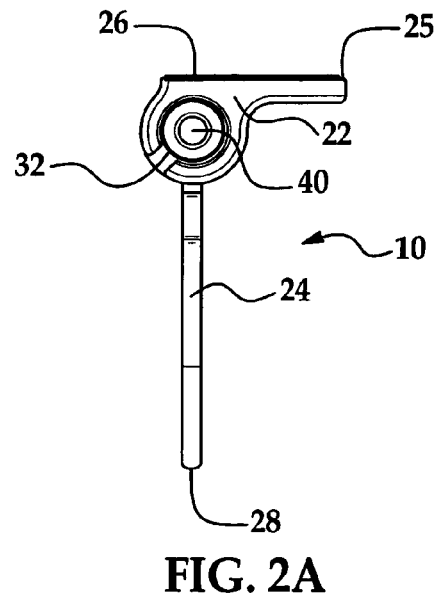
FIG. 2A is an end view of one embodiment of the present invention showing the base and stand in combination.

Referring to FIGS. 1 and 2, the laptop computer support device 10 is shown here in one embodiment of the invention. The laptop computer support device 10 is for use in elevating a laptop computer 12 on the top of a horizontal surface 14 to provide a comfortable typing angle for a computer user. Preferably, the laptop computer support device 10 is attached to the bottom surface 16 of the laptop computer 12 at the rear 18 of the laptop computer 12 and approximately equidistant from each side 20 of the laptop computer 12. The computer support device 10 is comprised of a base 22 and a stand 24 working in combination. The computer support device 10 is attached to the bottom surface 16 of the laptop computer 12 by any suitable attachment mechanism 26 located on the mounting surface 25 of the base 22. The suitable attachment mechanism 26 in one embodiment is an adhesive material. The computer support device 10 is shown in FIG. 1 in its open position, with the stand 24 locked in an open position with its support edge 28 resting on a horizontal surface 14. When the stand 24 is locked in the open position, the rear 18 of the laptop computer 12 is elevated by the stand 24 to provide a comfortable typing angle for a computer user.

Referring specifically to FIG. 2, there is shown a perspective view of the computer support device 10 in the open position showing the base 22 and the stand 24 in combination. There is also disclosed a suitable attachment mechanism 26 applied to the mounting surface 25 of the base 22. In one embodiment, the suitable attachment mechanism 26 is an adhesive material, and in a preferred embodiment, the adhesive material is a double-backed adhesive tape.

Figure 3:
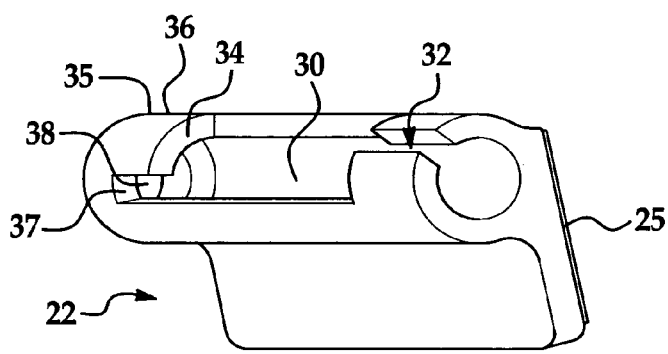
FIG. 3 is a perspective view of the base for one embodiment of the present invention.
Figure 3A:
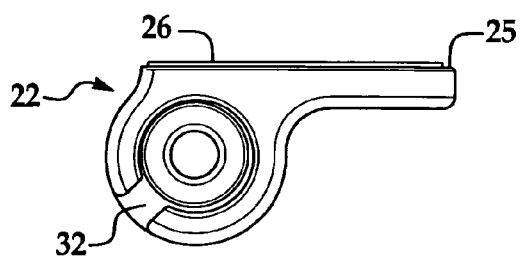
FIG. 3A is an end view of the base for one embodiment of the present invention.

Referring specifically to FIG. 3, there is shown a perspective view of the base 22. In the preferred embodiment, the base 22 is shown comprising a mounting surface 25, an insertion cavity 30, an entrance slot 32, an insertion stop face 34, a first detent slot 36 and a second detent slot 38. In one embodiment, the base 22 is injection molded. In a preferred embodiment, the base 22 is injection molded using a suitable plastic material, such as Acrylonitrile Butadiene Styrene plastic (ABS), polypropylene, polystyrene, or the like. In the most preferred embodiment, the plastic material is Acrylonitrile Butadiene Styrene plastic (ABS).

Figure 4:
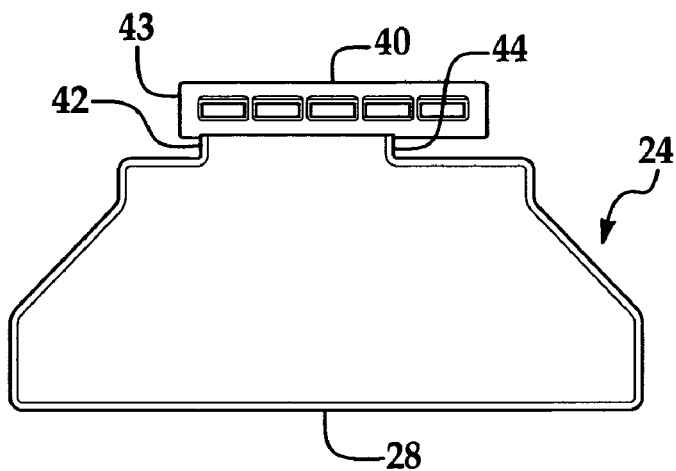
FIG. 4 is a front view of the stand for one embodiment of the present invention.
Figure 4A:
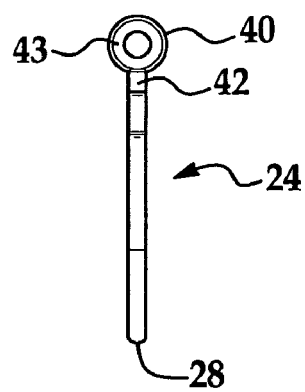
FIG. 4a is an end view of the stand for one embodiment of the present invention.

With reference to FIG. 4, there is shown a front view of the stand 24. In the preferred embodiment, the stand 24 comprises a support edge 28, a hinge pin 40, a front stop face 42, a hinge pin insertion face 43, and a rear stop face 44. In one embodiment, the stand 24 is injection molded. In a preferred embodiment, the stand 24 is injection molded using a plastic material that is suitable for injection molding, such as Acrylonitrile Butadiene Styrene plastic (ABS), polypropylene, polystyrene, or the like. In the most preferred embodiment, the plastic material is Acrylonitrile Butadiene Styrene plastic (ABS).

In one application and embodiment, the suitable attachment mechanism 26 is applied to the mounting surface 25 of the base 22. In the preferred embodiment, the suitable attachment mechanism 26 is double-backed adhesive tape. In the preferred embodiment, the base 22 is fixably attached to the bottom surface 16 of the laptop computer 12 at the rear 18 of the laptop computer 12 and approximately equidistant from each side 20 of the laptop computer 12. The stand 24 is inserted into the base 22 by inserting the hinge pin insertion face 43 portion of the hinge pin 40 into the entrance slot 32 on the base 22. The hinge pin 40 is moved into the insertion cavity 30 on the base 22 until the front stop face 42 contacts the insertion stop face 34. The stand 24 is downwardly rotated until the front stop face 42 is aligned with the second detent slot 38. The stand 24 is inserted into the second detent slot 38 until the front stop face 42 contacts the second detent stop face 37. In this configuration and as shown in FIG. 1, the stand 24 element of the laptop computer support device 10 is positioned to elevate the laptop computer 12 when the support edge 28 is configured to contact a horizontal surface 14 to provide a comfortable typing angle for a laptop computer user.

In yet another application and embodiment, the suitable attachment mechanism 26 is applied to the mounting surface 25 of the base 22. In the preferred embodiment, the suitable attachment mechanism 26 is double-backed adhesive tape. In the preferred embodiment, the base 22 is fixably attached to the bottom surface 16 of the laptop computer 12 at the rear 18 of the laptop computer 12 and approximately equidistant from each side 20 of the laptop computer 12. The stand 24 is inserted into the base 22 by inserting the hinge pin insertion face 43 portion of the hinge pin 40 into the entrance slot 32 on the base 22. The hinge pin 40 is moved into the insertion cavity 30 on the base 22 until the front stop face 42 contacts the insertion stop face 34. The stand 24 is downwardly rotated until the front stop face 42 is aligned with the second detent slot 38. The stand 24 is inserted into the second detent slot 38 until the front stop face 42 contacts the second detent stop face 37. In this configuration and as shown in FIG. 1, the stand 24 element of the laptop computer support device 10 is positioned to elevate the laptop computer 12 when the support edge 28 is configured to contact a horizontal surface 14 to elevate the laptop computer 12 to provide improved heat dissipation while the laptop computer 12 is being used.

Figure 5:
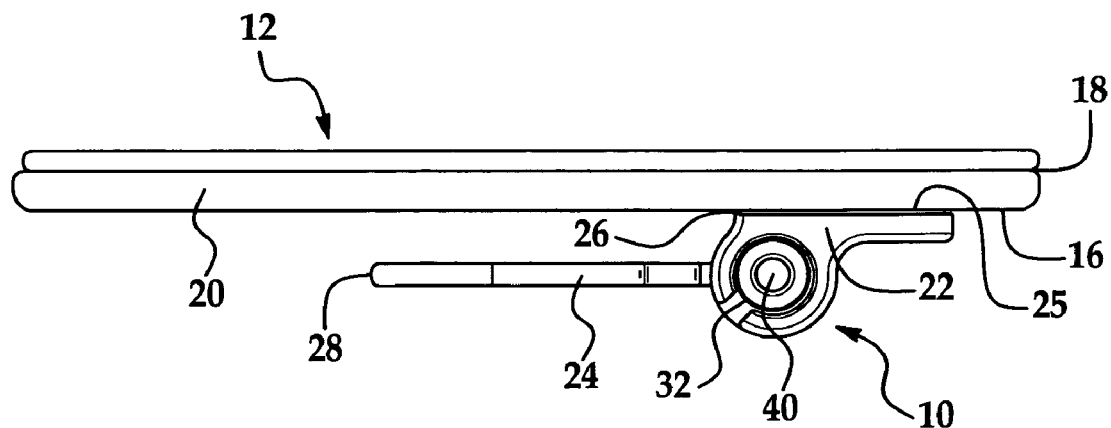
FIG. 5 is side view of one embodiment of the present invention shown in the stowed position.

In yet another application and embodiment, and with reference to FIG. 5, the suitable attachment mechanism 26 is applied to the mounting surface 25 of the base 22. The base 22 is brought into contact with the bottom surface 16 of the laptop computer 12. In the preferred embodiment, the suitable attachment mechanism 26 is double-backed adhesive tape. In the preferred embodiment, the base 22 is fixably attached to the bottom surface 16 of the laptop computer 12 at the rear 18 of the laptop computer 12 and approximately equidistant from each side 20 of the laptop computer 12. The stand 24 is inserted into the base 22 by inserting the hinge pin insertion face 43 portion of the hinge pin 40 into the entrance slot 32 on the base 22. The hinge pin 40 is moved through the insertion cavity 30 on the base 22 until the front stop face 42 contacts the insertion stop face 34. The stand 24 is upwardly rotated until the front stop face 42 is aligned with the first detent slot 36. The stand 24 is inserted into the first detent slot 36 until the front stop face 42 contacts the first detent stop face 35. In this configuration, and as shown in FIG. 5, the stand 24 element of the laptop computer support device 10 is positioned to be in a stowed position when the laptop computer user does not require the laptop computer 12 to be elevated, or when the laptop computer user desires to conveniently stow the laptop computer 12 in a carrying case (not shown).

The foregoing descriptions provide illustration of the inventive concepts. It should be understood that the foregoing is illustrative of particular embodiments of the invention, and particular applications thereof. The descriptions are not intended to be exhaustive or to limit the disclosed invention to the precise form disclosed. Modifications or variations are also possible in light of the above teachings. In view of the disclosures presented herein, yet other variations of the invention being disclosed will be apparent to one of skill in the art. The embodiments described above were chosen to provide the best application to thereby enable one of ordinary skill in the art to utilize the invention in various embodiments and with various modifications as are suited to the particular use contemplated. All such modifications and variations are within the scope of the invention. Any such modifications or variations which fall within the purview of the descriptions contained herein are intended to be included therein, as well. It is the following claims, including all equivalents, which define the scope of the invention.

What is claimed is:

1. A laptop computer support device, comprising:
   a base, the base comprising a mounting surface and a hinge pin receiving mechanism opposite the mounting surface, the hinge pin receiving mechanism comprised of an insertion cavity, an entrance slot, a first detent slot, a second detent slot, an insertion stop face, a first detent stop face, and a second detent stop face;
   a stand, the stand comprising a first end and a second end, the first end comprising a hinge pin releasably attached to the hinge pin receiving mechanism and the second end comprising a support edge that rests on a horizontal support surface; and
   an attachment mechanism, the attachment mechanism comprised of a suitable adhesive material such that the mounting surface may be fixedly attached to a laptop computer.

* * * * *